US011449717B2

(12) United States Patent
Zhang et al.

(10) Patent No.: US 11,449,717 B2
(45) Date of Patent: Sep. 20, 2022

(54) SYSTEM AND METHOD FOR IDENTIFICATION AND LOCALIZATION OF IMAGES USING TRIPLET LOSS AND PREDICTED REGIONS

(71) Applicant: FUJIFILM Business Innovation Corp., Tokyo (JP)

(72) Inventors: Cheng Zhang, Columbus, OH (US); Francine Chen, Menlo Park, CA (US); Yin-Ying Chen, San Jose, CA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 267 days.

(21) Appl. No.: 16/817,394

(22) Filed: Mar. 12, 2020

(65) Prior Publication Data
US 2021/0287054 A1 Sep. 16, 2021

(51) Int. Cl.
| | |
|---|---|
| *G06K 9/62* | (2022.01) |
| *G06T 3/40* | (2006.01) |
| *G06N 3/08* | (2006.01) |
| *G06N 20/00* | (2019.01) |
| *G06T 3/60* | (2006.01) |

(52) U.S. Cl.
CPC ......... *G06K 9/6268* (2013.01); *G06K 9/6228* (2013.01); *G06K 9/6232* (2013.01); *G06K 9/6256* (2013.01); *G06N 3/08* (2013.01); *G06N 20/00* (2019.01); *G06T 3/40* (2013.01); *G06T 3/60* (2013.01)

(58) Field of Classification Search
CPC .. G06K 9/6268; G06K 9/6228; G06K 9/6256; G06N 20/00; G06N 3/08; G06T 3/40; G06T 3/60
See application file for complete search history.

(56) References Cited

U.S. PATENT DOCUMENTS

| | | | |
|---|---|---|---|
| 10,025,950 B1 * | 7/2018 | Avasarala | G06F 21/6218 |
| 2016/0180151 A1 * | 6/2016 | Philbin | G06K 9/6256 |
| | | | 382/118 |
| 2017/0243082 A1 * | 8/2017 | Song | G06K 9/627 |

(Continued)

OTHER PUBLICATIONS

Jaderbeg, M., et al., Spatial Transfer Networks, Advances in Neural Information Processing Systems, 2015, pp. 2017-2015.

(Continued)

*Primary Examiner* — Fayyaz Alam
(74) *Attorney, Agent, or Firm* — Procopio, Cory, Hargreaves & Savitch LLP

(57) ABSTRACT

A method and system for classifying image features using a neural network is provided. The method includes training the neural network using triplet loss processes including receiving an anchor image, selecting a positive image and a negative image, generating a image embedding associated with each of the anchor image, the positive image, and the negative image, classifying image features extracted from the anchor image based on the image embedding of the anchor image, determining an image label location associated with the classified image features, extracting features associated with the determined image label location, and classifying the features associated with the determined image label location; and combining the multi-label loss with localized image classification loss and the triplet loss using a weighted loss sum.

19 Claims, 9 Drawing Sheets
(7 of 9 Drawing Sheet(s) Filed in Color)

(56) References Cited

U.S. PATENT DOCUMENTS

| | | | | |
|---|---|---|---|---|
| 2019/0216308 | A1* | 7/2019 | Senaras | G06T 7/0014 |
| 2019/0286652 | A1* | 9/2019 | Habbecke | G06F 16/71 |
| 2020/0019617 | A1* | 1/2020 | Eswaran | G06K 9/627 |
| 2020/0051252 | A1* | 2/2020 | Brown | G05D 1/0231 |
| 2020/0387755 | A1* | 12/2020 | Hagen | G06N 20/20 |
| 2021/0117948 | A1* | 4/2021 | Voss | G06N 3/08 |
| 2021/0256174 | A1* | 8/2021 | Bowen | G06N 3/04 |

OTHER PUBLICATIONS

Li, Z., et al., Thoracic Disease Identification and Localization with Limited Supervision, Proceedings of the IEEE Conference on Computer Vision and Pattern Recognition, 2018, pp. 8290-8299.

Ma, C-Y., et al., Learning to Generate Grounded Image Captions without Localization Supervision, arXiv:1906.00283, 2019, 16 pgs.

Rajpurkar, P., et al., Deep Learning for Chest Radiograph Diagnosis: A Retrospective Comparison of the CheXNeXt Algorithm to Practicing Radiologists, PLoS Medicine, 15(11), 2018, 17 pgs.

Schroff, F., et al., FaceNet: A Unified Embedding for Face Recognition and Clusterin, Proceedings of the IEEE Conference on Computer Vision and Pattern Recognition, 2015, pp. 815-823.

Selvaraju, R. R., et al., Grad-CAM: Visual Explanation from Deep Networks via Gradient-Based Localization, Proceedings of the IEEE International Conference on Computer Vision, 2017, pp. 618-626.

Wang, X., et al., ChestX-ray8: Hospital-scale Chest X-ray Database and Benchmarks on Weakly-Supervised Classification and Localization of Common Thorax Diseases, Proceedings of the IEEE Conference on Computer Vision and Pattern Recognition, 2017, pp. 2097-2106.

Xia, Y., et al., Dual Supervised Learning, Proceedings of the 34th International Conference on Machine Learning, 70, 2017, pp. 3789-3798.

Zhou, B., et al., Learning Deep Features for Discriminative Localization, Proceedings of the IEEE Conference on Computer Vision and Pattern Recognition, 2016, pp. 2921-2929.

Guan, Q., et al., Diagnose like a Radiologist: Attention Guided Convolutional Neural Network for Thorax Disease Classification, arXiv:1801.09927, 2018, 10 pgs.

* cited by examiner

SYSTEM AND METHOD FOR IDENTIFICATION AND LOCALIZATION OF IMAGES USING TRIPLET LOSS AND PREDICTED REGIONS

BACKGROUND

Field

The present disclosure relates to image analysis, and more specifically, to systems and methods of automatically identifying and localizing of regions of an image.

Related Art

In related art applications, the identification and localization of diseases in medical images has applications for the segmentation of diseases in a medical image. Further, it may also be useful for relating the textual description of a disease in a medical report to the region of the image being discussed in the report. Related art methods have allowed for automatic segmentation of organs. By knowing what diseases occur in an image and the approximate location of each disease, organ segmentation methods can be applied to disease segmentation. In turn, this will improve the efficiency of measuring disease size in a medical image.

Further, in the related art, the ability to perform disease localization also enables linking or highlighting the location in a medical image of a disease or abnormal condition described in a radiologist's or doctor's report. This can help improve the understanding of medical reports by doctors and their patients. Although there are several medical datasets with the presence of diseases annotated, there are very few annotations of disease location. Thus it is desirable to develop a system that requires little, if any, annotation of disease locations, e.g., bounding boxes indicating disease regions.

SUMMARY OF THE DISCLOSURE

Aspects of the present application may include a method of classifying image features using a neural network. The method includes training the neural network using triplet loss processes including receiving an anchor image and image labels associated with the anchor image, the anchor image to be used for training the neural network, selecting a positive image and image labels associated with the positive image, the positive image having at least one image label shared with the anchor image, selecting a negative image and image labels associated with the negative image, the negative image having no image labels shared with the anchor image, using an image feature embedding network to generate an image embedding associated with each of the anchor image, the positive image, and the negative image, classifying, by the neural network, image features extracted from the anchor image based on the image embedding of the anchor image, and calculating a triplet loss based on the image embeddings associated with each of the anchor image, the positive image, and the negative image to determine the classification weighting of the image features, using the trained neural network to classify image features of a test data image not having any associated labeled features.

Additional aspects of the present application may include a method of classifying image features using a neural network. The method includes training the neural network using triplet loss processes including receiving an anchor image and image labels associated with the anchor image, the anchor image to be used for training the neural network, using an image feature embedding network to generate an image embedding associated with the anchor image, classifying, by the neural network, image features extracted from the anchor image based on the image embedding of the anchor image, determining an image label location associated with the classified image features, extracting features associated with the determined image label location, classifying, using the neural network, the features associated with the determined image label location, and determining a localized image classification loss associated with the features associated with the determined image label location, using the trained neural network to classify image features of a test data image not having any associated labeled features.

Further aspects of the present application may include a non-transitory computer readable medium encoded with instructions for causing a computer to perform a method of classifying image features using a neural network. The method includes training the neural network using triplet loss processes including receiving an anchor image and image labels associated with the anchor image, the anchor image to be used for training the neural network, selecting a positive image and image labels associated with the positive image, the positive image having at least one image label shared with the anchor image, selecting a negative image and image labels associated with the negative image, the negative image having no image labels shared with the anchor image, using an image feature embedding network to generate an image embedding associated with each of the anchor image, the positive image, and the negative image, classifying, by the neural network, image features extracted from the anchor image based on the image embedding of the anchor image, and determining an image label location associated with the classified image features, extracting features associated with the determined image label location, classifying, using the neural network, the features associated with the determined image label location, determining a localized image classification loss associated with the features associated with the determined image label location, calculating a triplet loss based on the image embeddings associated with each of the anchor image, the positive image, and the negative image to determine the classification weighting of the image features, and combining the localized image classification loss and the triplet loss using a weighted loss sum, using the trained neural network to classify image features of a test data image not having any associated labeled features.

Further aspects of the present application may include a computing device for classifying image features using a neural network. The computing device may include means for training the neural network using triplet loss processes including receiving an anchor image and image labels associated with the anchor image, the anchor image to be used for training the neural network, selecting a positive image and image labels associated with the positive image, the positive image having at least one image label shared with the anchor image, selecting a negative image and image labels associated with the negative image, the negative image having no image labels shared with the anchor image, using an image feature embedding network to extract image features and generate an image embedding associated with each of the anchor image, the positive image, and the negative image, classifying, by the neural network, the image features extracted from the anchor image based on the image embedding of the anchor image, and determining an image label location associated with the classified image features, extracting features associated with the determined image label location, classifying, using the neural network, the features associated with the determined image label location, determining a localized image classification loss associated with the features associated with the determined image label location, calculating a triplet loss based on the image embeddings associated with each of the anchor image, the positive image, and the negative image to determine the classification weighting of the image features, and combining the localized image classification loss and the triplet loss using a weighted loss sum, using the trained neural network to classify image features of a test data image not having any associated labeled features.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
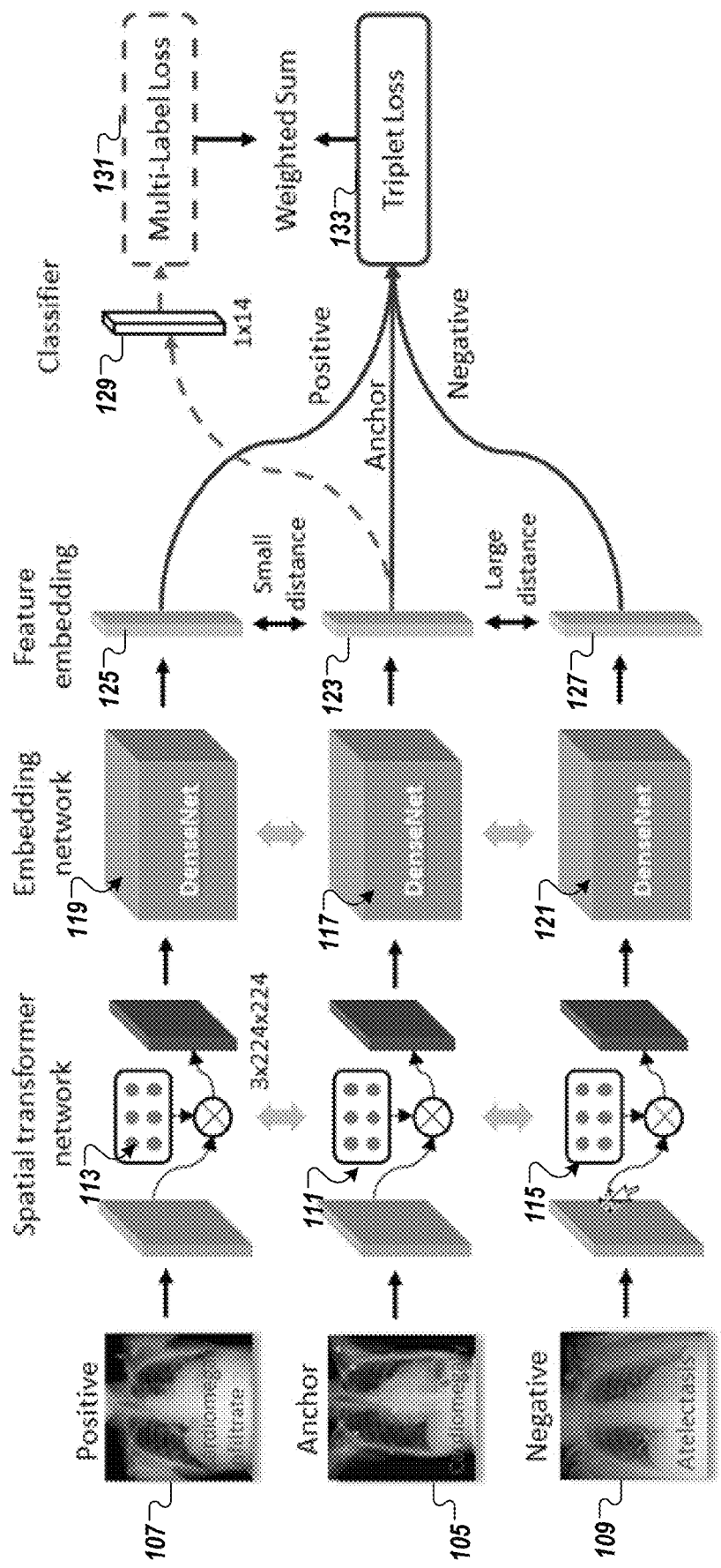
FIG. 1 illustrates a schematic representation of training a multi-label disease classifier using triplet loss in accordance with example implementations of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application.

In the present application, the term "computer readable medium" may include a local storage device, a cloud-based storage device, a remotely located server, or any other storage device that may be apparent to a person of ordinary skill in the art.

As discussed above, identification and localization of diseases in medical images has applications to segmentation of diseases in a medical image and is also useful for relating the textual description of a disease in a medical report to the region of the image being discussed. Existing methods of automatic segmentation of organs can be used when it is known what diseases occur in an image and the approximate location of each disease. However, there are very few annotations of disease location. Thus it is desirable to develop a system that requires little, if any, annotation of disease locations, e.g., bounding boxes indicating disease regions.

Example implementations of the present application may provide improved classification and localization of diseases in a medical image. In some example implementations of the present application, an object localization process may be used to automatically identify the region of an image containing relevant organs (e.g., lungs located in a chest), thereby removing errors due to mistakenly identifying diseases in regions where relevant organs are not located (e.g., in the shoulder or arm). In other example implementations, a triplet loss process may be applied to a classification model so that the model learns in a more continuous manner how much to increase the distance between pairs of images containing different diseases. Further, in some example implementations, estimated disease regions may be feedback to the model during training to better learn how to localize diseases ensuring disease size in a medical image. In some example implementations all of these techniques may be combined.

Though example implementations of the present application may be described in the context of disease identification in medical images, example implementations are not limited to analysis of medical images. Instead, example implementations may be applied to other types of image analysis that might be apparent to a person of ordinary skill in the art.

FIG. 1 illustrates a schematic representation 100 of training a multi-label disease classifier using triplet loss in accordance with example implementations of the present application. In some example implementations, medical images often contain a larger area than the area where diseases occur. For example, a chest x-ray often contains the shoulder and arms of a patient. In these example implementations, a Spatial Transformer Network may be used to crop the medical image to focus on areas where diseases occur. This step may be performed in some example implementations or may be omitted in some example implementations.

Further, as illustrated, in some example implementations, triplet loss techniques may be adapted as part of multi-label classification systems. Specifically, triplet loss may be used to encourage images with at least one common disease to be close together in feature space, and images without any common disease to be far apart in feature space. The triplet loss may minimize the distance between the image to be classified, or Anchor 105, and another image of the same type, (e.g., the same patient, same disease, or other similar characteristics). As illustrated in FIG. 1, images of the same type are shown as being images containing at least one common disease (e.g., positive image 107). Further, images for which the intersection of disease labels is null are considered to be of different types; these serve as examples of negative images 109. With a triplet loss, for each input Anchor image 105, one positive image 107 and one negative image 109 are randomly selected from the same training batch. In some example implementations, hard example mining may be used to improve the performance of the triplet loss techniques discussed in greater detail below.

As illustrated in FIG. 1, once the positive image 107 and the negative image 109 have been randomly selected, each image (e.g., the anchor image 105, the positive image 107, and the negative image 109) are processed by a spatial transformer network to transform each image to allow for image comparisons. For example, anchor image 105 is processed by the spatial transformer network at 111. Further, positive image 107 is processed by the spatial transformer network at 113. Still further, negative image 109 is processed by the spatial transformer network at 115.

The spatial transformer network may be is a differentiable module that applies cropping, translation, rotation, scale, and skew to the input image (feature map), and requires only 6 parameters. Specifically, example implementations the input chest x-ray image 105 with width W and height H may be denote $x=(x_i, x_j)_{i=1,2};::::; W_j=1,2,::::, H$. The spatial transformer network outputs a 6-dimensional vector at 111, which can be parameterized as an affine transformation $A_\Theta$. In the affine case, the pointwise transformation is:

$$\begin{pmatrix} x_i^s \\ x_j^s \end{pmatrix} = \underbrace{\begin{bmatrix} s & 0 & t_x \\ 0 & s & t_y \end{bmatrix}}_{A_\theta} \begin{pmatrix} x_i^t \\ x_j^t \\ 1 \end{pmatrix} \quad \text{(Eq. 1)}$$

where $(x_i^t, y_i^t)$ are the target coordinates in the output feature map, $(x_i^s, y_i^s)$ are the source coordinates in the input image (feature map), and $A_\Theta$ is the affine transformation allowing cropping, translation, and isotropic scaling to the original image. During training, the model learns the values of s (scale) and $t_x$ and $t_y$ (translation).

After the spatial transformer network processes each image (e.g., anchor image 105, positive image 107, and negative image 109), each image is processed by an image feature embedding network to embed features of the image to be used for disease classification to generate an image embedding. As illustrated in FIG. 1, image embedding 123 is generated by the image feature embedding network at 117 from the anchor image 105. Similarly, image embedding 125 is generated by the embedding network at 119 from the positive image 107. Further, image embedding 127 is generated by the embedding network at 121 from the negative image 109.

In some example implementations, the disease locations information may be included as embedded features by using a disease localizer to embed disease location features. The use of the disease localizer is discussed in greater detail below with respect to FIGS. 2 and 3.

The image embedding 123 created from the anchor image 105 may be then passed through a classifier network 129 to calculate a lost factor based on label assigned to the anchor image 105 in the training data. In other words, a multi-label loss factor 131 is calculated based on the difference between the assigned label associated with the anchor image 105 from the training data and the classification of the anchor image 105 by the classified network 129.

In addition to the multi-label loss factor 131, a second loss factor, the triplet loss factor 133 may be calculated as discussed below. The two losses are then combined using a weighted sum, with equal weight given to the whole image and the localized image classification losses. Alternatively, the weights could be learned during the training.

In some example implementations, consider a triplet constraint set X may be considered as follows:

$$X = \{(x_i, x_i^+, x_i^-) | (x_i, x_i^+) \in P; (x_i, x_i^-) \in N; i=1,2, \ldots, M\} \quad \text{(Eq. 2)}$$

where P contains positive pairs and N includes negative pairs, and M denotes the cardinality of the entire triplet set. The similarity function of two samples is denoted as $l_2$ distance:

$$\text{dist}(x_i, x_j) = \|x_i; x_j\|_2^2 \quad \text{(Eq. 3)}$$

In some example implementations, a cosine distance may alternatively be used.

In some example implementations, the hinge loss for one triplet given the Anchor $x_i$ may be defined as:

$$l(x_i, x_i^+, x_i^-) = [\text{dist}(x_i, x_i^+) - \text{dist}(x_i, x_i^-) + m]_+ \quad \text{(Eq. 4)}$$

where m is a margin that is enforced between positive and negative pairs. Therefore the global triplet loss $L_{triplet}$ is being minimized over all possible triplets in the training set can be computed as:

$$L_{triplet} = \Sigma_{(xi, x+i, x-i) \in x} l(x_i, x_i^+, x_i^-) \quad \text{(Eq. 5)}$$

Finally, the total loss $L_{cls}$ for classification integrated with a triplet learning can be formulated as:

$$L_{cls} = \beta L_{binary} + (1-\beta) L_{triplet} \quad \text{(Eq. 6)}$$

where $L_{binary}$ is the traditionally-trained binary cross entropy loss for multi-label classification and the $\beta$ is the coefficient.

In some example implementations, disease location algorithms may be used to train a disease classifier to further improve the performance for disease identification and localization. For example, existing image region locating algorithms such as CAM or GradCAM may be used to train the classifier. Both algorithms are computed from network activations for a class or disease prediction and produce a "heatmap", where the regions in the image that support a classification have a larger value. Because multi-label classification is being performed, the algorithm (e.g., Grad-CAM, CAM, or other algorithm) may be run individually for each identified class. Use of this localization to improve disease identification is discussed in greater detail below with respect to FIGS. 2 and 3.

Figure 2:
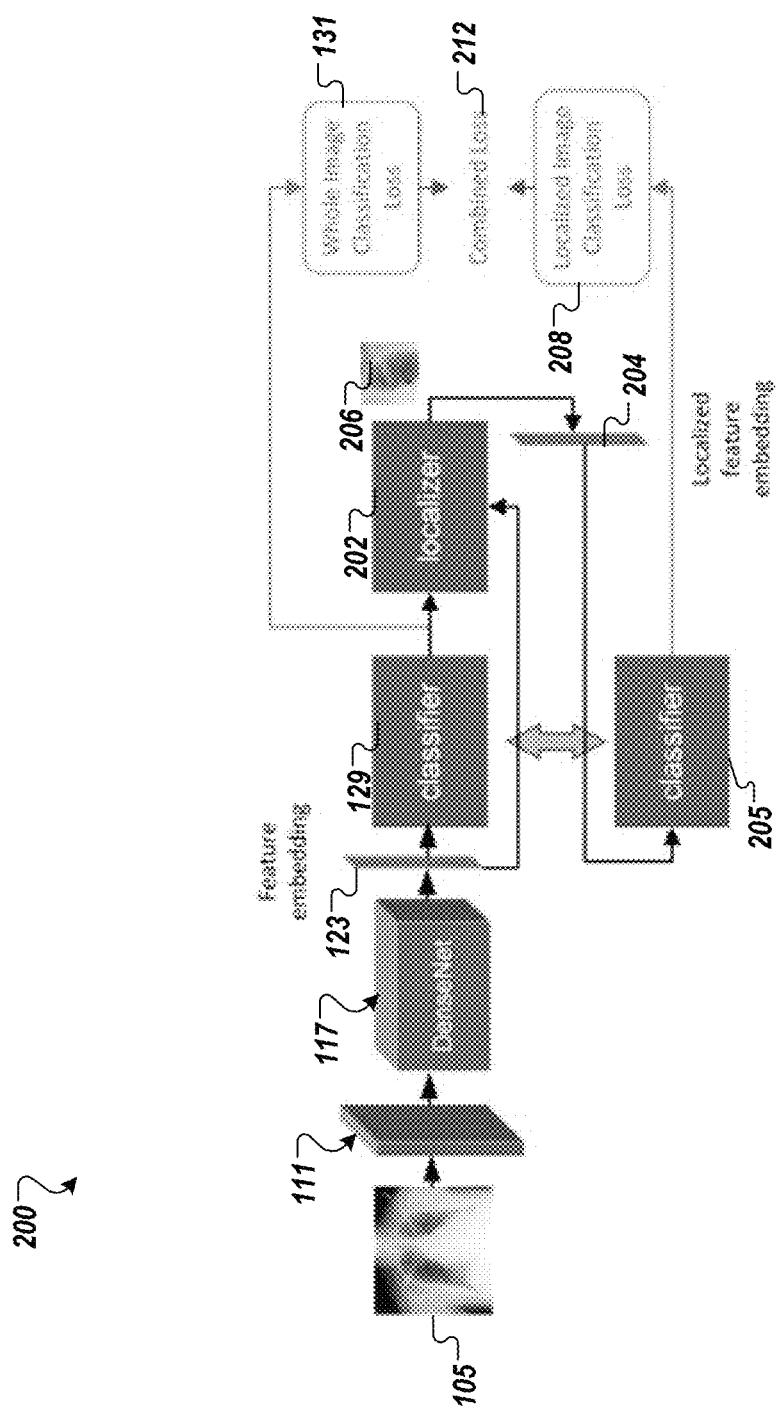
FIG. 2 illustrates a schematic representation of training an image classifier using localized disease predictions in accordance with example implementations of the present application.

FIG. 2 illustrates a schematic representation 200 of training an image classifier using localized disease predictions in accordance with example implementations of the present application. In some example implementations, localize disease productions can be used to check whether a predicted location of disease agrees with the classifier. In such example implementations, if the image is incorrectly cropped, a classification will likely be incorrect. In other words, if an image has been cropped to exclude the disease region, the disease classification may be incorrect.

Similar to the model discussed with respect FIG. 1, the anchor image 105 (the image being analyzed for training purposes) is passed through a spatial transformer network 111 to transform the image to a common image scale. The transformed image from the spatial transformer network 111 is then passed through an image feature embedding network 117 to embed features of the image to be used for disease classification to generate an image embedding 123. The image embedding 123 includes disease location information that will be used by a disease localizer 202 to embed disease location features as discussed below.

Similar to the model described in FIG. 1, the image embedding 123 created from the anchor image 105 may be then passed through a classifier network 129 to calculate a lost factor based on label assigned to the anchor image 105 in the training data. In other words, a multi-label loss factor 131 (also referred to as the whole image calculation loss) is calculated based on the difference between the assigned label associated with the anchor image 105 from the training data and the classification of the anchor image 105 by the classified network 129.

In addition to computing the classifier loss (whole image classification loss 131) based on classifying the disease(s) in the whole input image, example implementations may use the predicted bounding boxes for each disease to crop an image prior to classification. Specifically, as illustrated, the localizer 202 determines a predicted location 206 for the disease and crops the image to the area of the predicted location for the disease to generate a localized image embedding 204. Specifically, the localizer 202 extracts the features of the region within a predicted location bounding box of a localized disease in the anchor image 105. The feature values of the area outside the bounding box are set to 0. The modified features, or localized image embedding 204, represent the image inside the bounding box and are input into a second classifier. An alternative approach would be to mask the non-disease regions with a value, e.g., 0, and to use the masked image as input to the classifier. Note that by selecting the features within the predicted bounding box (or the features from localization), several layers of computation may be skipped, leading to greater efficiency.

In some example implementations, the CAM localization algorithm may be used, where the activations at the last layer of DenseNet are extracted. Alternatively, the GradCAM localization algorithm may be used in example implementations. Different localization methods may be used in different example implementations. In some example implementations, the maximum value over all features may be used for normalization. In other example implementations, the difference between the maximum and minimum value over all features may be used for normalization. In each case, the locations of feature activations that are greater than a fixed threshold may be identified. A rectangular bounding box around the threshold activations is computed and features outside the bounding box are zeroed. The resulting feature map is then fed into the classifier 205, which shares weights with the original classifier (see FIG. 2). Alternatively, a separate classifier initialized with the trained classifier parameters (only the classification layer(s)) could be used for classifying the localized image. In another alternative example implementation, the localized region of the image determined by the localizer 202 may be determined from any layer of the image feature embedding network representation (DENSENET representation), rather than the feature embedding just before the classifier.

In some example implementations, the loss 131 from the whole image classification and the loss from the localized image classification 208 are combined as a weighted sum 212 using Equation 7 below:

$$L_{total} = \alpha L_{whole} + (1-\alpha) L_{local} \quad \text{(Eq. 7)}$$

where α varies from 0 to 0.5 over a number of epochs so that the effect of the localized image loss is added gradually. For example in some example implementations, α may be increased over 20 epochs. After that, α may be held constant.

In some example implementations, this training model may be initialized with the parameters of the trained baseline model. The trained baseline model may be obtained by training for a fixed number of iterations or by fully training until the loss asymptotes on a validation dataset. This initialization, or pre-training, is used so that in the first iterations, the estimated local region is more likely to be correct, and so the local features are more likely to have some information. If the initialization is not performed, then in the initial iterations, the estimate of the local region estimate is purely noise, and therefore, the model is given very noisy local features which would increase the difficulty during early training iterations.

In some example implementations, the predicted localized features model shown in FIG. 2 can be combined with the triplet loss prediction model of FIG. 1. Specifically, the triplet model can first be trained alone to provide a pre-trained classification model, analogous to pre-training the binary classifier. Then the classifier network 129 in FIG. 1 can be replaced with two classifiers 129, 205 and a localizer 202 shown in FIG. 2. The loss would then be the combination of the whole image loss (multi-label loss 131, the localized image loss 208, and the triplet loss 133. The combined model aims to learn a better feature space for distinguishing multiple diseases.

However, in alternative example implementations, the predicted localized features model of FIG. 2 may be used alone without the triplet loss prediction model of FIG. 1. In still other example implementations, the triplet loss prediction model of FIG. 1 may be used alone without the predicted localized features model of FIG. 2.

Figure 3:
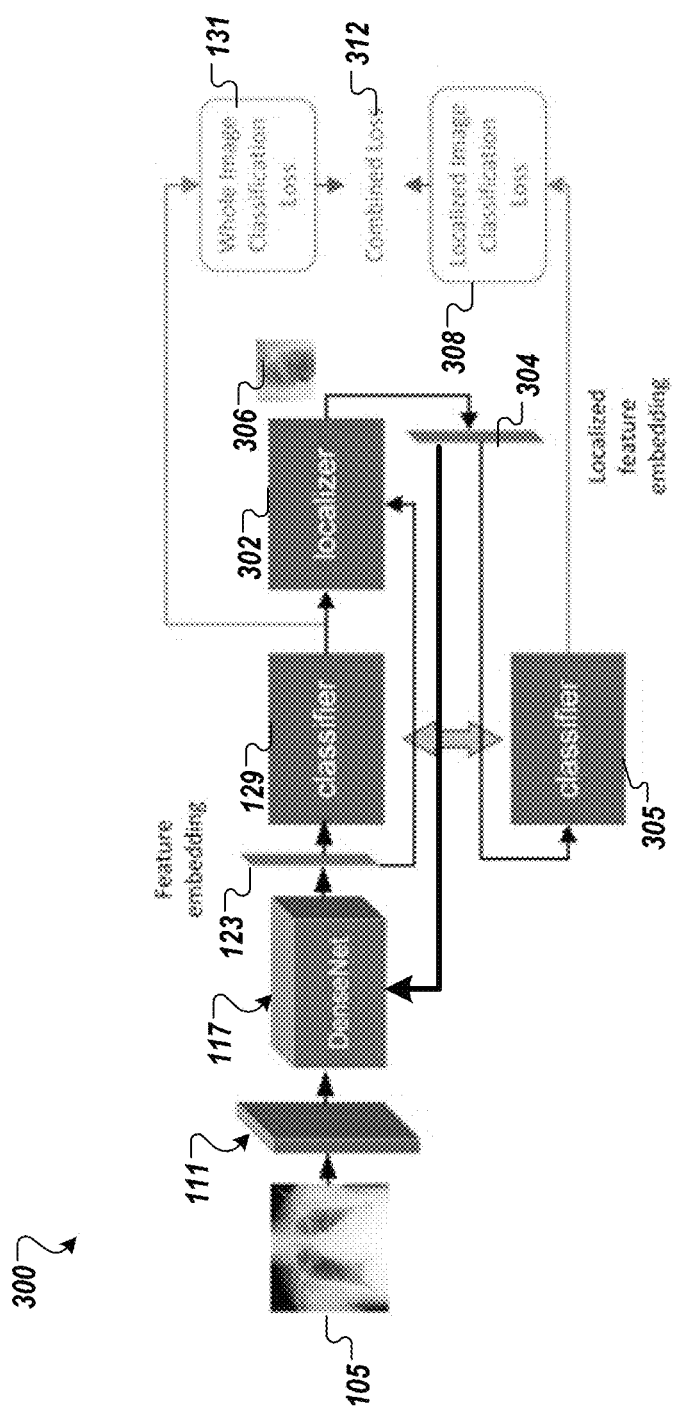
FIG. 3 illustrates a schematic representation of training an image classifier using localized disease predictions in accordance with other example implementations of the present application.

FIG. 3 illustrates a schematic representation 300 of training an image classifier using localized disease predictions in accordance with other example implementations of the present application. The model of FIG. 3 is similar to the mode of FIG. 2 and similar description has been provided below. In some example implementations, localized disease productions can be used to check whether a predicted location of disease agrees with the classifier. In such example implementations, if the image is incorrectly cropped, a classification will likely be incorrect. In other words, if an image has been cropped to exclude the disease region, the disease classification may be incorrect.

Similar to the models discussed with respect FIGS. 1 and 2, the anchor image 105 (the image being analyzed for training purposes) is passed through a spatial transformer network 111 to transform the image to a common image scale. The transformed image from the spatial transformer network 111 is then passed through an image feature embedding network 117 to embed features of the image to be used for disease classification to generate an image embedding 123. The image embedding 123 includes disease location information that will be used by a disease localizer 202 to embed disease location features as discussed below.

Similar to the models described with respect to FIGS. 1 and 2, the image embedding 123 created from the anchor image 105 may be then passed through a classifier network 129 to calculate a lost factor based on label assigned to the anchor image 105 in the training data. In other words, a multi-label loss factor 131 (also referred to as the whole image calculation loss) is calculated based on the difference between the assigned label associated with the anchor image 105 from the training data and the classification of the anchor image 105 by the classified network 129.

In addition to computing the classifier loss (whole image classification loss 131) based on classifying the disease(s) in the whole input image, example implementations may use the predicted bounding boxes for each disease to crop an image prior to classification. Specifically, as illustrated, the localizer 302 determines a predicted location for the disease and crops the image to the area of the predicted location for the disease to generate a localized image embedding 304.

Specifically, the localizer 302 extracts the features of the region within a predicted location bounding box of a localized disease in the anchor image 305. The feature values of the area outside the bounding box are set to 0. The modified features, or localized image embedding 304, represent the image inside the bounding box and are input into a second classifier. An alternative approach would be to mask the non-disease regions with a value, e.g., 0, and to use the masked image as input to the classifier. Note that by selecting the features within the predicted bounding box (or the features from localization), several layers of computation may be skipped, leading to greater efficiency.

Additionally, in the model of FIG. 3, the image embedding 304 may be feedback in to the image feature embedding network 117 to improve image embedding of the features being extracted from the anchor image 105

In some example implementations, the CAM localization algorithm may be used, where the activations at the last layer of DenseNet are extracted. Alternatively, the GradCAM localization algorithm may be used in example implementations. Different normalization methods may be used in different example implementations. In some example implementations, the maximum value over all features may be used for normalization. In other example implementations, the difference between the maximum and minimum value over all features may be used for normalization. In each case, the locations of feature activations that are greater than a fixed threshold may be identified. A rectangular bounding box around the threshold activations is computed and features outside the bounding box are zeroed. The resulting feature map is then fed into the classifier 305, which shares weights with the original classifier (see FIG. 3. Alternatively, a separate classifier initialized with the trained classifier parameters (only the classification layer(s)) could be used for classifying the localized image. The loss 131 from the whole image classification and the loss from the localized image classification 308 are combined as a weighted sum 312 using Equation 8 below:

$$L_{total}=\alpha L_{whole}+(1-\alpha)L_{local} \quad \text{(Eq. 8)}$$

where $\alpha$ varies from 0 to 0.5 over a number of epochs so that the effect of the localized image loss is added gradually. For example in some example implementations, $\alpha$ may be increased over 20 epochs. After that, $\alpha$ may be held constant.

In some example implementations, this training model may be initialized with the parameters of the trained baseline model. The trained baseline model may be obtained by training for a fixed number of iterations or by fully training until the loss asymptotes on a validation dataset. This initialization, or pre-training, is used so that in the first iterations, the estimated local region is more likely to be correct, and so the local features are more likely to have some information. If the initialization is not performed, then in the initial iterations, the estimate of the local region estimate is purely noise, and therefore, the model is given very noisy local features which would increase the difficulty during early training iterations.

In some example implementations, the predicted localized features model shown in FIG. 3 can be combined with the triplet loss prediction model of FIG. 1. Specifically, the triplet model can first be trained alone to provide a pre-trained classification model, analogous to pre-training the binary classifier. Then the classifier network 129 in FIG. 1 can be replaced with two classifiers 129, 305 and a localizer 302 shown in FIG. 3. The loss would then be the combination of the whole image loss (multi-label loss 131, the localized image loss 308, and the triplet loss 133. The combined model aims to learn a better feature space for distinguishing multiple diseases.

However, in alternative example implementations, the predicted localized features model of FIG. 3 may be used alone without the triplet loss prediction model of FIG. 1. In still other example implementations, the triplet loss prediction model of FIG. 1 may be used alone without the predicted localized features model of FIG. 3.

Figure 4:
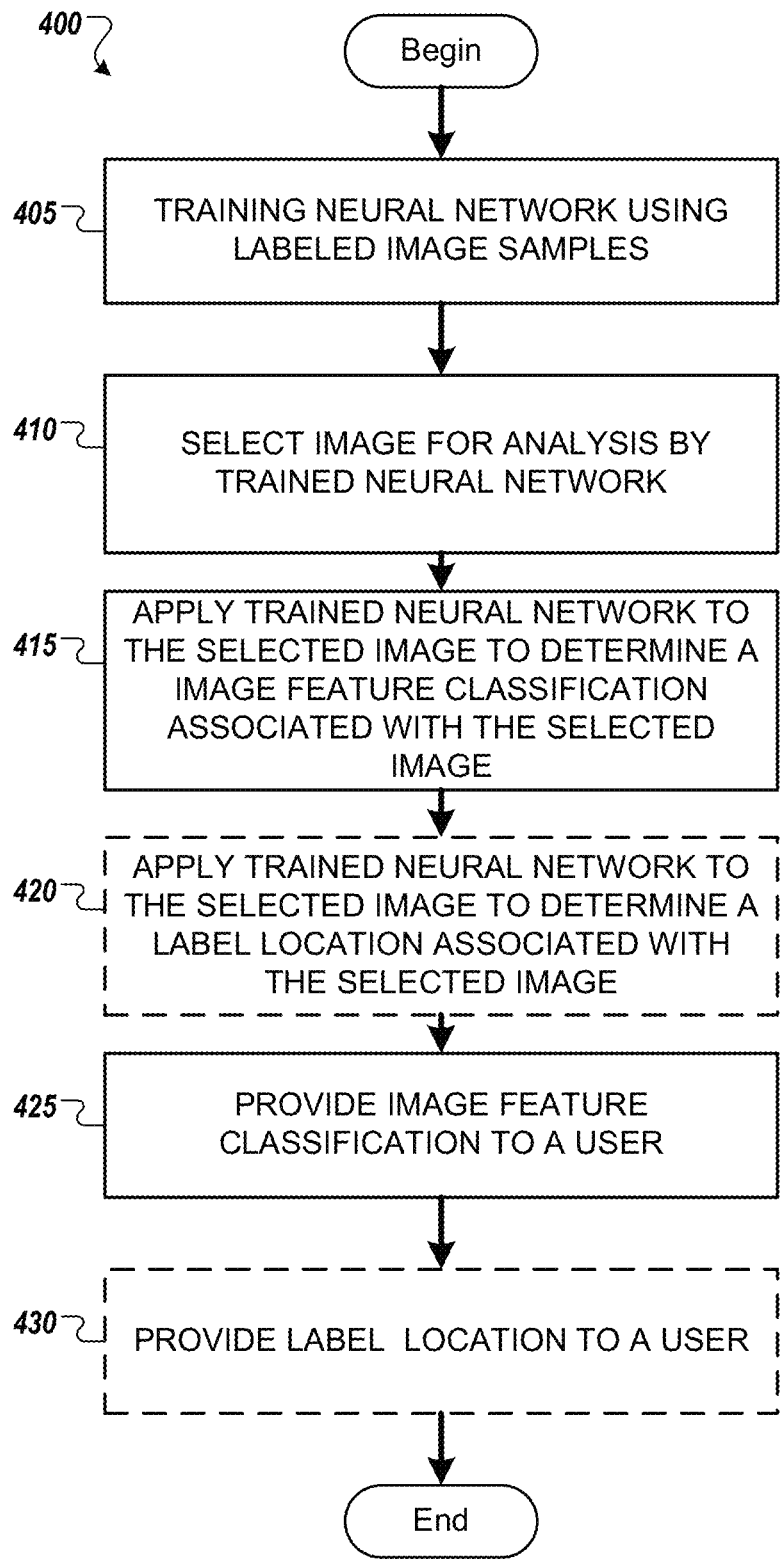
FIG. 4 illustrates a flow chart of a process of classifying images using trained neural networks in accordance with example implementations of the present application.

FIG. 4 illustrates a flow chart of a process 400 of classifying images using trained neural networks in accordance with example implementations of the present application. The process 400 may be performed by a computing device in a computing environment. For example, computing device 905 of computing environment 900 of FIG. 9 may perform the process 400.

As illustrated in FIG. 4, a neural network is trained using labeled image samples at 405. The training may involve using multiple labeled image samples labeled with image labels but not image label location information (e.g., information identifying the region within an image that an image label is located). For example, the labeled image samples may be medical images from a publically available medical image sets (e.g., NIH CHESTXRAY14 dataset) that are labeled with disease labels or other diagnostic information.

In some example implementations, the training of the neural network at 405 may involve training an image classifier using triplet loss as illustrated in FIG. 1. In other example implementations, the training of neural network at 405 may involve training an image classifier using localized disease predictions as illustrated in FIG. 2 or 3. In still other example implementations, the training of the neural network at 405 may involve combining training an image classifier first using triplet loss as illustrated in FIG. 1 and then training an image classifier using localized disease predictions as illustrated in FIG. 2 or 3.

After the neural network is trained, an image for analysis (e.g., a testing data image) is selected at 410. The testing data image that is selected may be a new subject (e.g., a new patient) different from the subjects of the images in the training image data and suspected of having the same types of features (e.g., possibly the same disease) as the training in some example implementations. The testing data image that is selected may be the same subject (e.g., the same patient) as a subject of the images in the training data. Additionally, the test image date and the training image data mat be two-dimensional slices of a three dimensional image.

At 415, the trained neural network is applied to the selected image to determine an image feature classification associated with the selected image. For example, the neural network may analyze the selected image to determine a disease classification associated with the selected image. In some example implementations, the application of the trained neural network to the selected image may involve transforming the image using a special transformer network to have constant image orientations and scale consistent with the training data used to train the image data.

At 420, the trained neural network may optionally also determine an image label location (e.g., a region within an image that an image label is located) associated with the determined image feature classification. For example, the trained neural network may also detect the area of the image associated with the disease classification determined at 415.

At 425, the determined image feature classification may be provided or exported to a user. For example, a disease classification report may be generated an appended to a medical report associated with the selected medical image.

At 430, the determined image label location (e.g., a region within an image that an image label is located) may also optionally be provided or exported to a user. For example, a bounding box identifying a diseased region of the selected medical image may be appended to a medical report. The process 400 may end after the image feature classification is provided to the user at 425, or after the determined image label location is optionally be provided or exported to the user at 430.

Evaluation of Example Implementations

TABLE 1

Summary of Classification and Localization, performance for two baseline models, our model, and the Google model which uses some labeled bounding boxes when training, unlike the other models. The best-performing model which does not use labeled bounding boxes is shown in bold. The best-performing model of all models is shown in bold italic.

| Task | ChestX-ray14[7] | CheXNext[4] | Ours (STN + triplet) | Google[2] |
|---|---|---|---|---|
| Classification (AUC) | 0.745 | 0.793 | 0.795 | *0.804* |
| Localization (IoU = 0.5) | 0.06 | 0.17 | 0.26 | *0.27* |

For evaluation of example implementations, NIH ChestXray14 dataset was used. For the Triplet Loss experiments, the task was multi-label classification of the 14 labeled diseases in the dataset. A second task was localization of 8 diseases using GradCAM without localized features being present in the data set.

For the experiments in using localized features, example implementations were compared to binary models for three diseases, which should more clearly indicate whether localized features improve performance for each disease without confounding effects from other diseases. Although binary models were used for the localized features experiments to examine whether localized features help, the method can be integrated into the STN+triplet loss model. The diseases were Cardiomegaly, Mass and Nodule. The classification test set for these are the same as the test data for the three diseases in multi-label classification. The localization test set is the subset of the test data with labeled bounding boxes.

STN and Triplet Loss Results

Two baseline models ChestX-ray14 (by NIH) and CheXNext were used for comparison to the example implementation model (STN+Triplet). Baseline model ChestX-ray14 (by NIH) compared using the four image analysis models (i.e., AlexNet, GoogLeNet, VGGNet-16 and ResNet-50) for computing an image representation. CheXNext showed that using DenseNet121 had better performance than the models used by ChestX-ray14 (by NIH). Both baseline models perform disease classification and then localization. The Example implementation model was also compared against a Google model [2], which used 70% of the bounding box labels to train their localization model. Bounding box labels are difficult to obtain since doctors need to manually label, which is outside of the normal practice.

Table 1 shows classification and localization performance for the two baseline models, ChestXray14 and CheXNext, as well as for the Google model which uses additional data. Of the models which do not use some labeled bounding boxes in training, the example implementation model (STN+Triplet) performs best overall for both classification and localization. Additionally, the example implementation model also demonstrated performance is close to the performance of the Google model which utilizes more labeled data during training.

Figure 5:
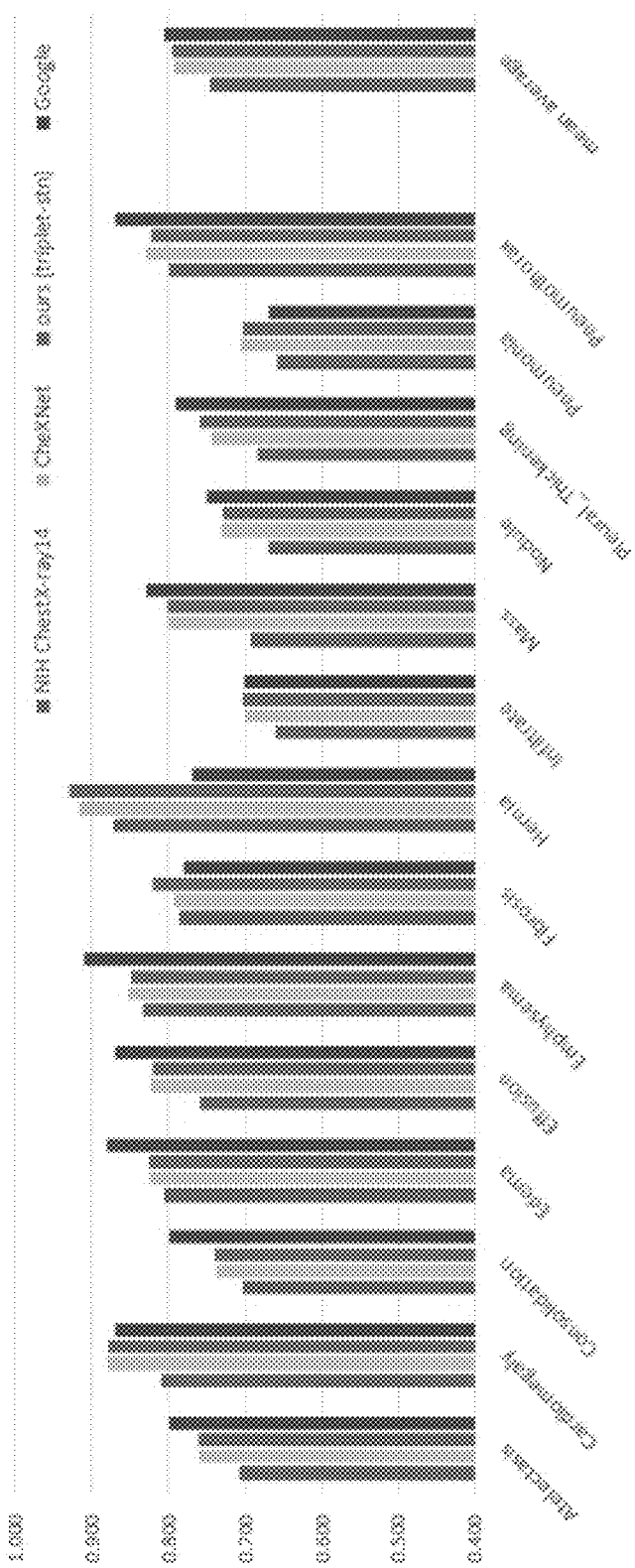
FIGS. 5 & 6 illustrate graphical representations of evaluation results of example implementations of the present application.
Figure 6:
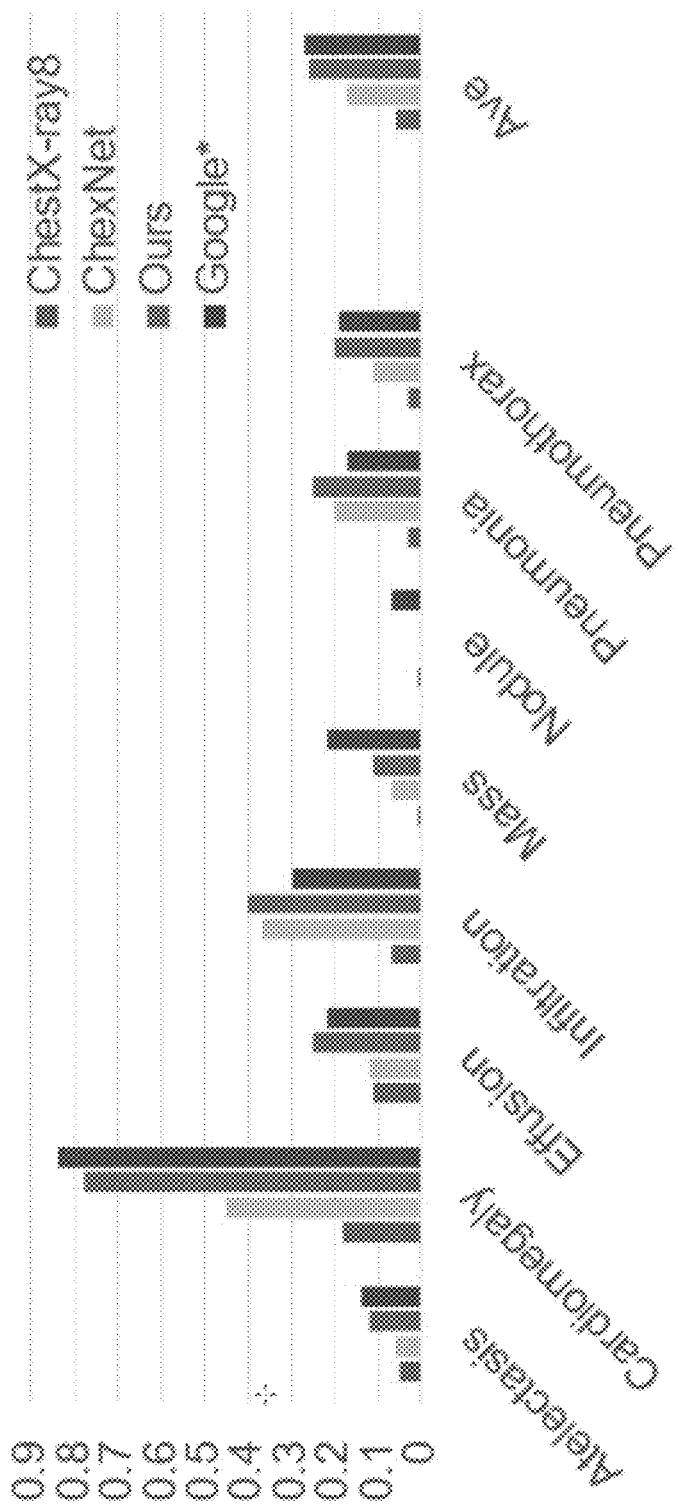

More detailed performance for the four models for each of the diseases are shown in FIGS. 5 and 6. FIG. 5 illustrates classification accuracy for baseline models, the example implementation model and the Google model, which used some label bounding boxes during training. FIG. 6 illustrates localization performance measured using IOU for baseline models, the example implementation model and the Google model, which used some labeled bounding boxes during training.

Training Using Localized Features

For these experiments, the effectiveness of training using localized features was compared against a baseline model composed of DenseNet121 with a single layer disease classifier. A separate binary classifier was created for each disease to assess whether using the localized features together with the features from the whole image improves performance.

TABLE 2

Classification accuracy for the baseline model and for models with computed localized features using two different methods for normalizing the activation maps. The best test model accuracies are in bold.

| Disease | Data | Baseline Model | Localized features models | |
|---|---|---|---|---|
| | | | norm1 | norm2 |
| Cardiomegaly | val | 0.8041 | 0.7895 | 0.7982 |
| | test | 0.7699 | 0.7769 | 0.7750 |
| Mass | val | 0.7569 | 0.7541 | 0.7486 |
| | test | 0.6822 | 0.6974 | 0.7022 |
| Nodule | val | 0.6601 | 0.6544 | 0.6498 |
| | test | 0.6205 | 0.6389 | 0.6436 |

Table 2 above shows the classification accuracy for different diseases for the baseline model and two models using computed localized features with the two different normalization methods. For the accuracy evaluation, a consistent improvement in test accuracy was noted when localized features are used with either of the normalization methods across all three diseases. In contrast, the best performing validation accuracies were for the baseline model, but the best validation performance did not translate to best test performance. The difference in performance

TABLE 3

Localization test performance for different models evaluated as percentage with Intersection over Union (IoU) greater than the given threshold. The best model localization performances are in bold.

| Disease | IoU thresh | Baseline Model | Localized features models | |
|---|---|---|---|---|
| | | | norm1 | norm2 |
| Cardiomegaly | 0.1 | 0.9932 | 0.9658 | 0.9726 |
| | 0.5 | 0.3836 | 0.3562 | 0.4315 |
| Mass | 0.1 | 0.4824 | 0.5176 | 0.3529 |
| | 0.5 | 0.0588 | 0.0706 | 0.0353 |
| Nodule | 0.1 | 0.1772 | 0.1899 | 0.2152 |
| | 0.5 | 0.0000 | 0.0000 | 0.0000 | between validation and test for both of the models employing localized features is smaller than the baseline. The smaller difference may indicate that the localized features help the models to generalize better to new data.

Table 3 compares the localization performance of the same models as in Table 2. The baseline model performed better than both localized features models only for Cardiomegaly with an IoU threshold of 0.1. The norm1 method, which normalizes by the minimum activation value, had better performance than the baseline for three cases, while the norm2 method had better performance than the baseline in two cases.

From the results in Tables 2 and 3, it is noted that the use of predicted localized features consistently improved test classification accuracy across the three test diseases. Further, the localized features models were somewhat better than the baseline model: each had the best localization performance for two conditions where one was for an IoU of 0.5, a stricter criteria requiring higher overlap. The baseline model had the best performance for one condition, which was the less strict criteria where the IOU threshold was 0.1.

Qualitative Results

Figure 7:
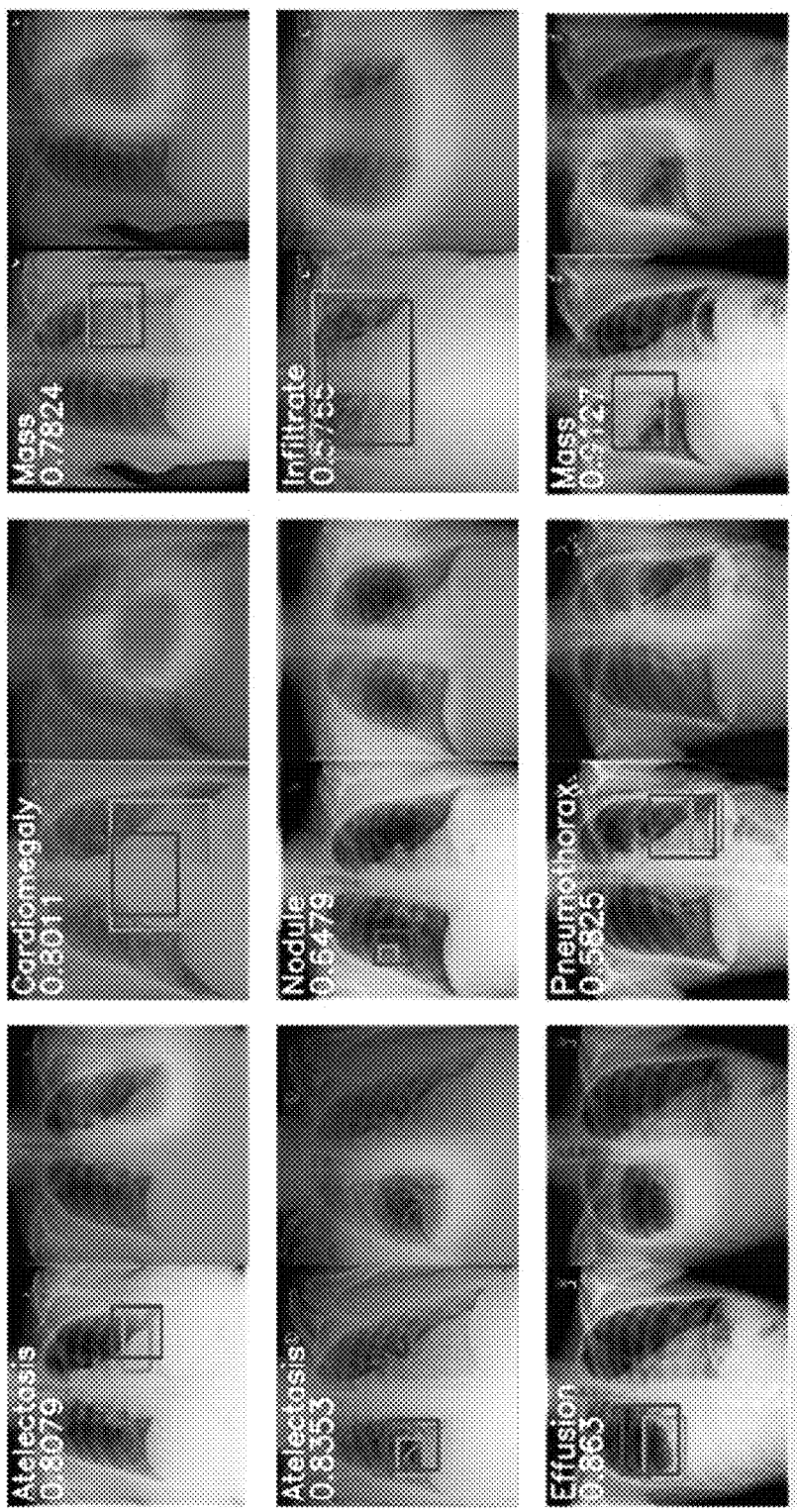
FIGS. 7 and 8 show example heat maps and the predicted and ground truth location of diseases using example implementations of the present application.
Figure 8:
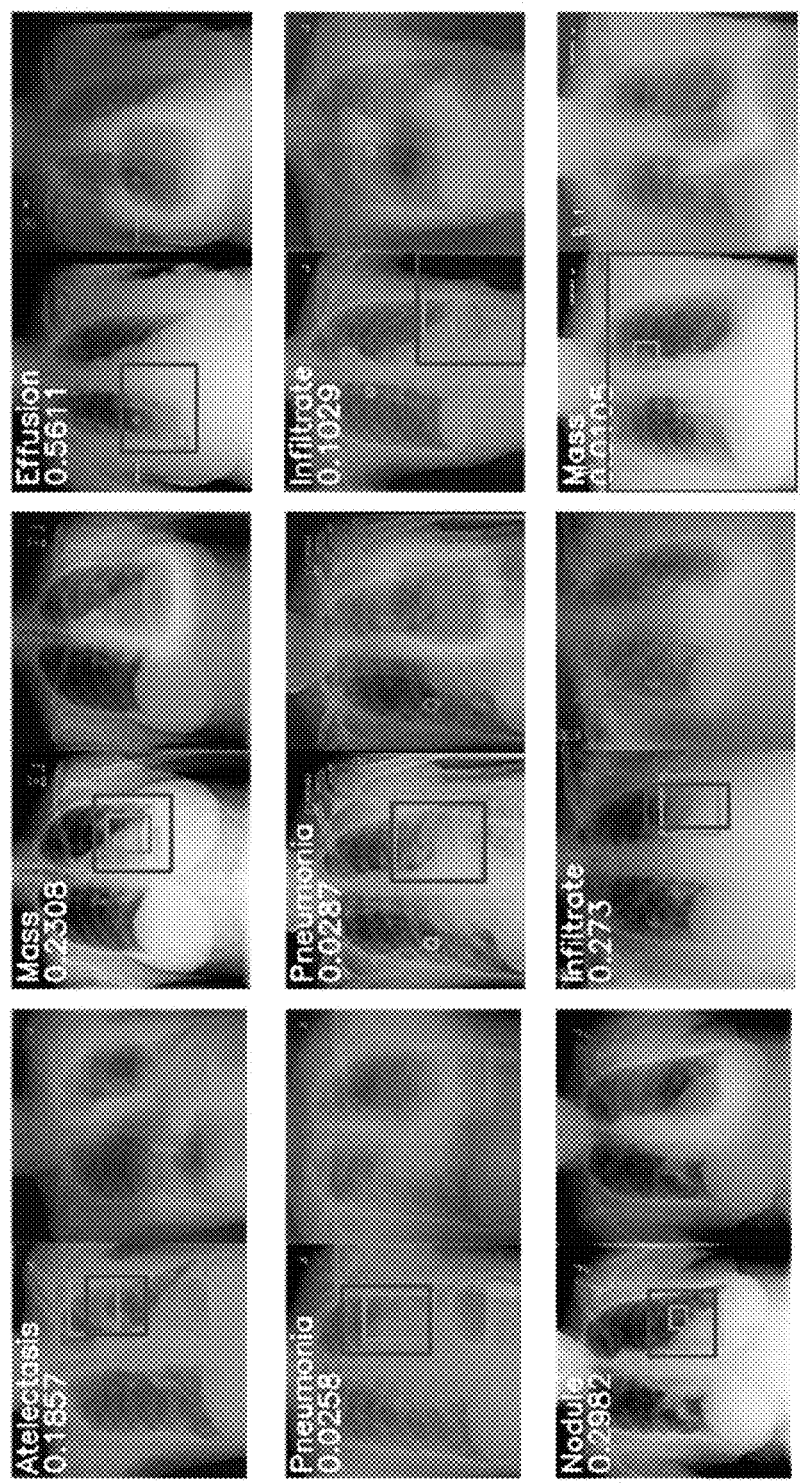

FIGS. 7 and 8 show example heat maps and the predicted (Red Box) and ground truth (Green Box) location of diseases using the multi-label triplet model. FIG. 7 shows examples when the true disease is predicted with probability greater than 0.5 and there is at least 0.5 IoU between the ground truth and predicted disease bounding boxes. FIG. 8 shows examples of incorrect predictions. The first two columns show cases with correct bounding boxes but the predicted probability of disease is less than 0.5, which is incorrect. The third column shows cases where the bounding box is incorrect, and the predicted probability of disease may or may not be greater than 0.5.

Example Computing Environment

Figure 9:
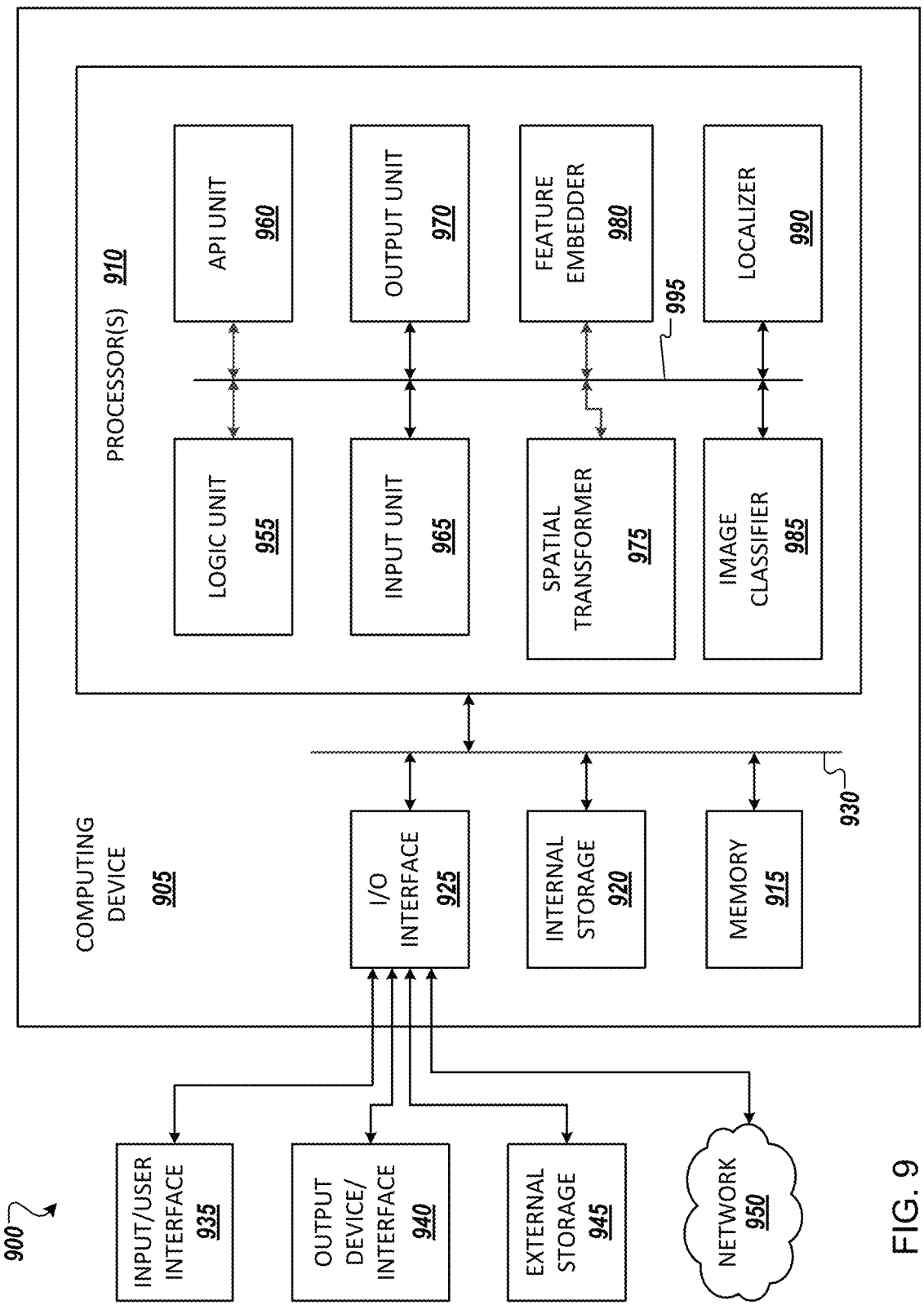
FIG. 9 illustrates an example computing environment with an example computer device suitable for use in some example implementations.

FIG. 9 illustrates an example computing environment 900 with an example computer device 905 suitable for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/interface 935 and output device/interface 940. Either one or both of input/interface 935 and output device/interface 940 can be a wired or wireless interface and can be detachable. Input/interface 935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 940 may include a display, television, monitor, printer, speaker, braille, or the like. In some example implementations, input/interface 935 (e.g., user interface) and output device/interface 940 can be embedded with, or physically coupled to, the computing device 905. In other example implementations, other computing devices may function as, or provide the functions of, an input/interface 935 and output device/interface 940 for a computing device 905. These elements may include, but are not limited to, well-known AR hardware inputs so as to permit a user to interact with an AR environment.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, spatial transformer 975, feature embedder 980, image classifier 985, localizer 990 and inter-unit communication mechanism 995 for the different units to communicate with each other, with the OS, and with other applications (not shown).

For example, output unit 970, spatial transformer 975, feature embedder 980, image classifier 985, and localizer 990 may implement one or more processes shown in FIG. 6 and implement the architectures of FIGS. 1-4. The described units and elements can be varied in design, function, configuration, or implementation and are not limited to the descriptions provided.

In some example implementations, when information or an execution instruction is received by API unit 960, it may be communicated to one or more other units (e.g., spatial transformer 975, feature embedder 980, image classifier 985, and localizer 990). For example, spatial transformer 975 may transform one or more images to rotate and scale the image for a common orientation. The feature embedder 980 may extract and embed image features from the transferred images. The image classifier 985 may classify features of the transformed image based on the embedded image features. The localizer 990 determine image locations associated with the embedded image features to assist with image classification.

In some instances, the logic unit 955 may be configured to control the information flow among the units and direct the services provided by API unit 960 spatial transformer 975, feature embedder 980, image classifier 985, and localizer 990 in some example implementations described above. For example, the flow of one or more processes or implementations may be controlled by logic unit 955 alone or in conjunction with API unit 960.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced with those specifically defined or described matters or with other or different elements or matters not described. It will be appreciated by those familiar with this field that changes may be made in these example implementations without departing from the subject matter described herein, as defined in the appended claims and their equivalents.

What is claimed is:

1. A method of classifying image features using a neural network, the method comprising:
    training the neural network using triplet loss processes including:
    receiving an anchor image and image labels associated with the anchor image, the anchor image to be used for training the neural network;
    selecting a positive image and image labels associated with the positive image, the positive image having at least one image label shared with the anchor image;
    selecting a negative image and image labels associated with the negative image, the negative image having no image labels shared with the anchor image;
    using an image feature embedding network to generate an image embedding associated with each of the anchor image, the positive image, and the negative image;
    classifying, by the neural network, image features extracted from the anchor image based on the image embedding of the anchor image;
    calculating a multi-label loss based on the classified image features extracted from the anchor image associated with the image embedding and the image labels associated with the anchor image; and
    combining the multi-label loss with the calculated triplet loss using a weighted loss sum;
    calculating a triplet loss based on the image embeddings associated with each of the anchor image, the positive image, and the negative image to determine a classification weighting of the image features;
    using the trained neural network to classify image features of a test data image not having any associated labeled features.

2. The method of claim 1, wherein the training the neural network further comprises:
    using a spatial transformer network to transform each of the anchor image, the positive image, and the negative image by scaling, rotating and cropping to establish a common view orientation.

3. A method of classifying image features using a neural network, the method comprising:
    training the neural network using triplet loss processes including:
    receiving an anchor image and image labels associated with the anchor image, the anchor image to be used for training the neural network;
    selecting a positive image and image labels associated with the positive image, the positive image having at least one image label shared with the anchor image;
    selecting a negative image and image labels associated with the negative image, the negative image having no image labels shared with the anchor image;
    using an image feature embedding network to generate an image embedding associated with each of the anchor image, the positive image, and the negative image;
    classifying, by the neural network, image features extracted from the anchor image based on the image embedding of the anchor image;
    determining an image label location associated with the classified image features;
    extracting features associated with the determined image label location;
    classifying, using the neural network, the features associated with the determined image label location;
    determining a localized image classification loss associated with the features associated with the determined image label location; and
    combining the multi-label loss with the localized image classification loss and the triplet loss using a weighted loss sum;
    calculating a triplet loss based on the image embeddings associated with each of the anchor image, the positive image, and the negative image to determine a classification weighting of the image features;
    using the trained neural network to classify image features of a test data image not having any associated labeled features.

4. The method of claim 3, further comprising identifying an image label location on the test image data using the trained neural network.

5. The method of claim 3, wherein the training the neural network further comprises:
    generating a new image embedding of the anchor image based on the extracted features associated with the determined image label location; and classifying, by the neural network, the features extracted from the anchor image based on the new image embedding.

6. The method of claim 3, wherein the anchor image, the positive image, and the negative image are each medical diagnostic images associated with one or more diseases.

7. A method of classifying image features using a neural network, the method comprising:
  training the neural network using triplet loss processes including:
    receiving an anchor image and image labels associated with the anchor image, the anchor image to be used for training the neural network;
    using an image feature embedding network to generate an image embedding associated with the anchor image;
    classifying, by the neural network, image features extracted from the anchor image based on the image embedding of the anchor image;
    determining an image label location associated with the classified image features;
    extracting features associated with the determined image label location;
    classifying, using the neural network, the features associated with the determined image label location; and
    determining a localized image classification loss associated with the features associated with the determined image label location;
  using the trained neural network to classify image features of a test data image not having any associated labeled features.

8. The method of claim 7, wherein the training the neural network further comprises:
  calculating a multi-label loss based on the classified image features extracted from the anchor image associated with the image embedding and the image labels associated with the anchor image; and
  combining the multi-label loss with the localized image classification loss using a weighted loss sum.

9. The method of claim 7, further comprising identifying an image label location on the test image data using the trained neural network.

10. The method of claim 8, wherein the training the neural network further comprises:
  generating a new image embedding of the anchor image based on the extracted features associated with the determined image label location; and
  classifying, by the neural network, the features extracted from the anchor image based on the new image embedding.

11. The method of claim 7, wherein the training the neural network further comprises:
  selecting a positive image and image labels associated with the positive image, the positive image having at least one image label shared with the anchor image;
  selecting a negative image and image labels associated with the negative image, the negative image having no image labels shared with the anchor image,
  wherein the using an image feature embedding network to generate an image embedding comprises using an image feature embedding network to generate an image embedding associated with each of the anchor image, the positive image, and the negative image;
  calculating a triplet loss based on the image embeddings associated with each of the anchor image, the positive image, and the negative image to determine the classification weighting of the image features; and
  combining the multi-label loss with the localized image classification loss and the triplet loss using a weighted loss sum.

12. The method of claim 11, wherein the training the neural network further comprises:
  using a spatial transformer network to transform each of the anchor image, the positive image, and the negative image by scaling, rotating and cropping to establish a common view orientation.

13. The method of claim 11, wherein the anchor image, the positive image, and the negative image are each medical diagnostic images associated with one or more diseases.

14. A non-transitory computer readable medium encoded with instructions for causing a computer to perform a method of classifying image features using a neural network, the method comprising:
  training the neural network using triplet loss processes including:
    receiving an anchor image and image labels associated with the anchor image, the anchor image to be used for training the neural network;
    selecting a positive image and image labels associated with the positive image, the positive image having at least one image label shared with the anchor image;
    selecting a negative image and image labels associated with the negative image, the negative image having no image labels shared with the anchor image;
    using an image feature embedding network to generate an image embedding associated with each of the anchor image, the positive image, and the negative image;
    classifying, by the neural network, image features extracted from the anchor image based on the image embedding of the anchor image; and
    determining an image label location associated with the classified image features;
    extracting features associated with the determined image label location;
    classifying, using the neural network, the features associated with the determined image label location;
    determining a localized image classification loss associated with the features associated with the determined image label location;
    calculating a triplet loss based on the image embeddings associated with each of the anchor image, the positive image, and the negative image to determine a classification weighting of the image features; and
    combining the localized image classification loss and the triplet loss using a weighted loss sum;
  using the trained neural network to classify image features of a test data image not having any associated labeled features.

15. The non-transitory computer readable medium of claim 14, wherein the training the neural network further comprises:
  calculating a multi-label loss based on the classified image features extracted from the anchor image associated with the image embedding and the image labels associated with the anchor image; and
  combining the multi-label loss with localized image classification loss and the triplet loss using a weighted loss sum.

16. The non-transitory computer readable medium of claim 15, wherein the training the neural network further comprises:

using a spatial transformer network to transform each of the anchor image, the positive image, and the negative image by scaling, rotating and cropping to establish a common view orientation.

17. The non-transitory computer readable medium of claim 15, further comprising identifying an image label location on the test image data using the trained neural network.

18. The non-transitory computer readable medium of claim 17, wherein the training the neural network further comprises:
   generating a new image embedding of the anchor image based on the extracted features associated with the determined image label location; and
   classifying, by the neural network, the features extracted from the anchor image based on the new image embedding.

19. The non-transitory computer readable medium of claim 18, wherein the anchor image, the positive image, and the negative image are each medical diagnostic images associated with one or more diseases.

* * * * *